Feb. 10, 1959 — J. H. HOERN — 2,872,853
MILLING AND BORING MACHINE
Filed Dec. 28, 1953 — 3 Sheets-Sheet 2

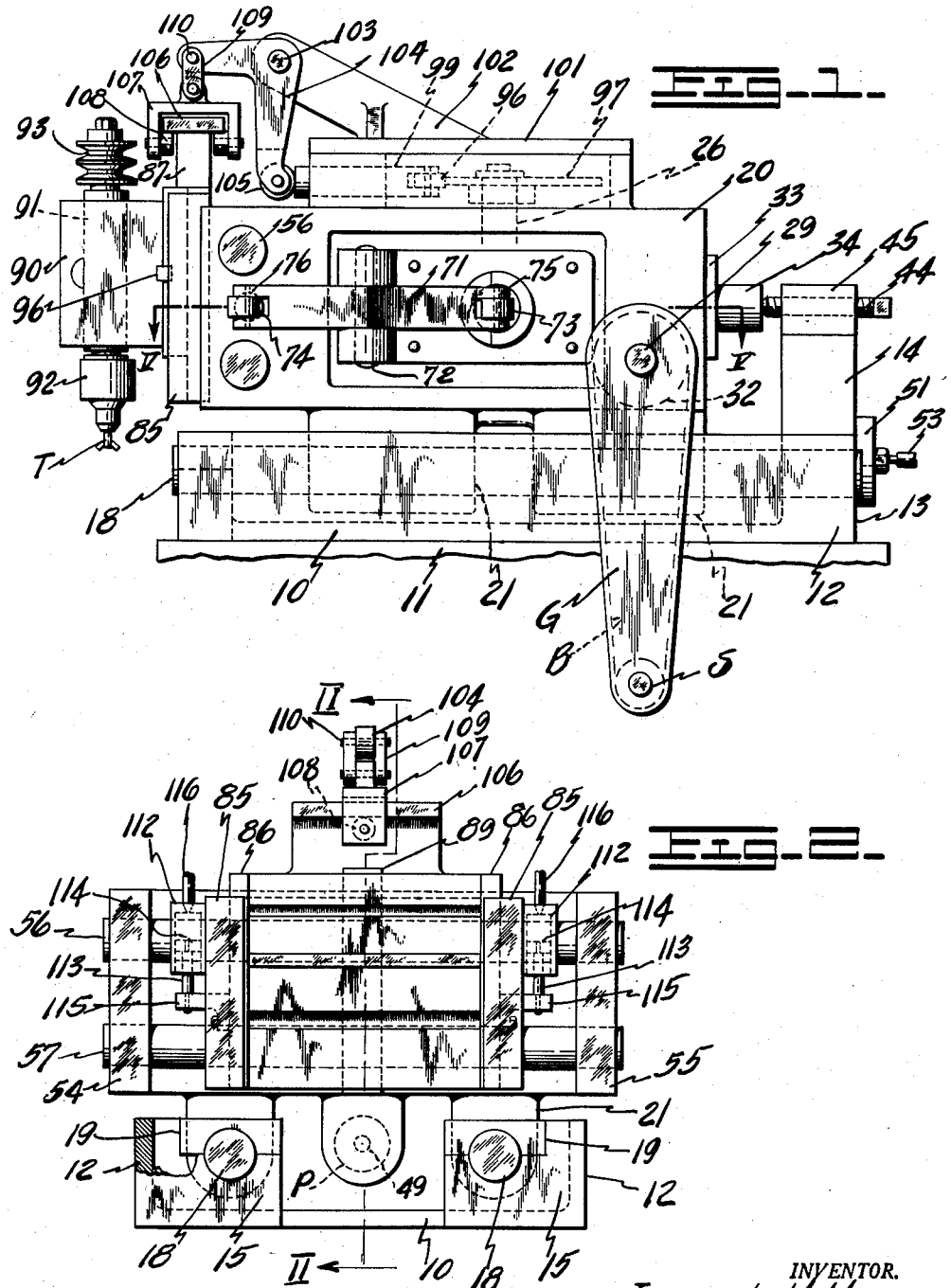

INVENTOR.
Joseph H. Hoern
BY Harman & Harman
ATTORNEY.

Feb. 10, 1959 J. H. HOERN 2,872,853
MILLING AND BORING MACHINE
Filed Dec. 28, 1953 3 Sheets-Sheet 3
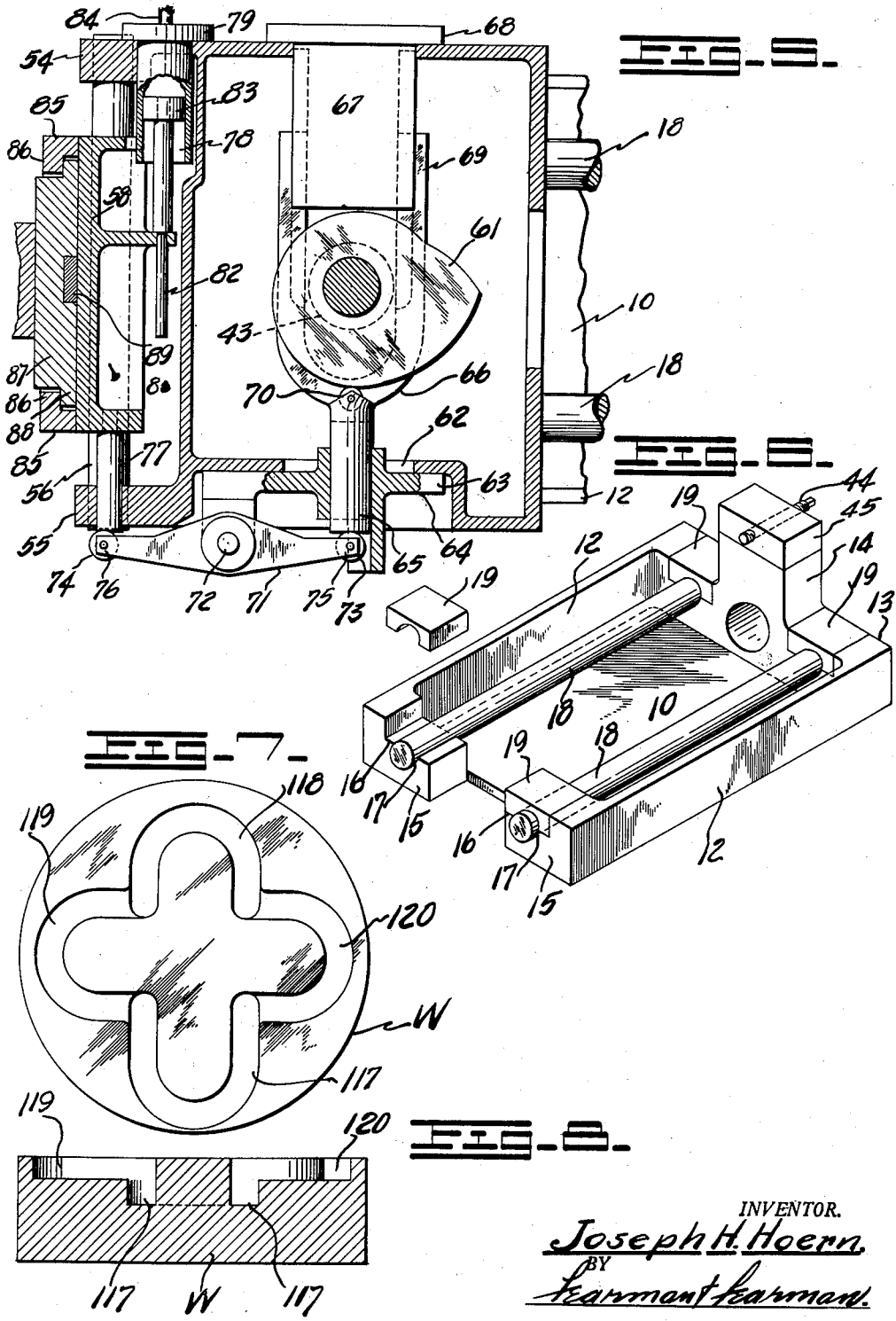
INVENTOR.
Joseph H. Hoern,
BY
Fairmont Fairman.
ATTORNEYS United States Patent Office 2,872,853
Patented Feb. 10, 1959

2,872,853

MILLING AND BORING MACHINE

Joseph H. Hoern, Saginaw, Mich., assignor, by mesne assignments, of small percentages to various assignees Application December 28, 1953, Serial No. 400,531

6 Claims. (Cl. 90—15)

This invention relates to contour milling and boring machines for machining work surfaces and depths of irregular configuration or pattern so that a complete machining operation can be performed during each cycle of the machine.

One of the prime objects of the invention is to design a milling and boring machine which is capable of economically milling or boring work surfaces or irregular configuration to precision tolerances on a mass production basis.

A further object of the invention is to design a milling and boring machine in which the cutting tool can be simultaneously moved longitudinally, transversely, and vertically to machine non-symmetrical workpieces of an intricate nature or pattern.

Another object of the invention is to design a milling and boring machine in which the movement of the cutting tool is cam-controlled and synchronized, so that a complete machining operation can be performed during each cycle of the machine.

A further object of the invention is to design a milling and boring machine tool of this type which is capable of longitudinal, transverse, and vertical movement, or any combination or variation thereof, and whose path and pattern of movement can be readily changed to adapt it to work surfaces of different configuration and pattern by merely substituting different cams in the machine.

Another object of the invention is to design a machine of the type described, whose moving elements are rigidly supported or mounted in a manner in which the accuracy of the cut taken is unaffected by cutting vibrations and compliance with extremely close tolerance requirements is insured.

A further object of the invention is to design a machine of this type in which a pressure medium insufficient to interfere with the operation of the movement of the controlling cams, is employed to retain the moving elements in engagement with the cams so that absolute standards of accuracy can be maintained.

A still further object of the invention is to design a milling and boring machine of this type which is of compact and practical construction and can be simply and economically manufactured and assembled.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side elevational view of my contour milling and boring machine.

Fig. 2 is a front elevational view with the spindle housing assembly thereof removed to illustrate various features of the machine.

Fig. 5 is also a sectional, top plan view taken on the line V—V of Fig. 1 to show the cam means for actuating the cross-slide transversely.

Fig. 6 is a perspective plan view of the base or frame of the machine.

Fig. 7 is a top plan view of a typical workpiece illustrating an off-center, irregular work pattern of varying depth such as can be cut in one cycle of the machine.

Fig. 8 is a sectional, edge elevational view thereof.

Figure 3:
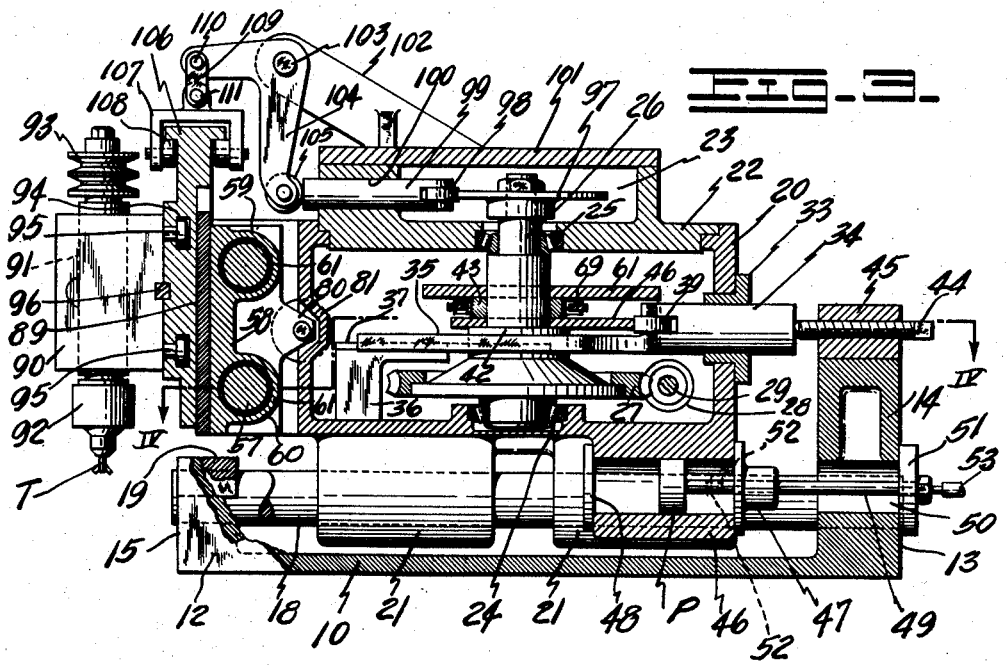
Fig. 3 is a sectional, side elevational view taken generally on the line II—II of Fig. 2.
Figure 4:
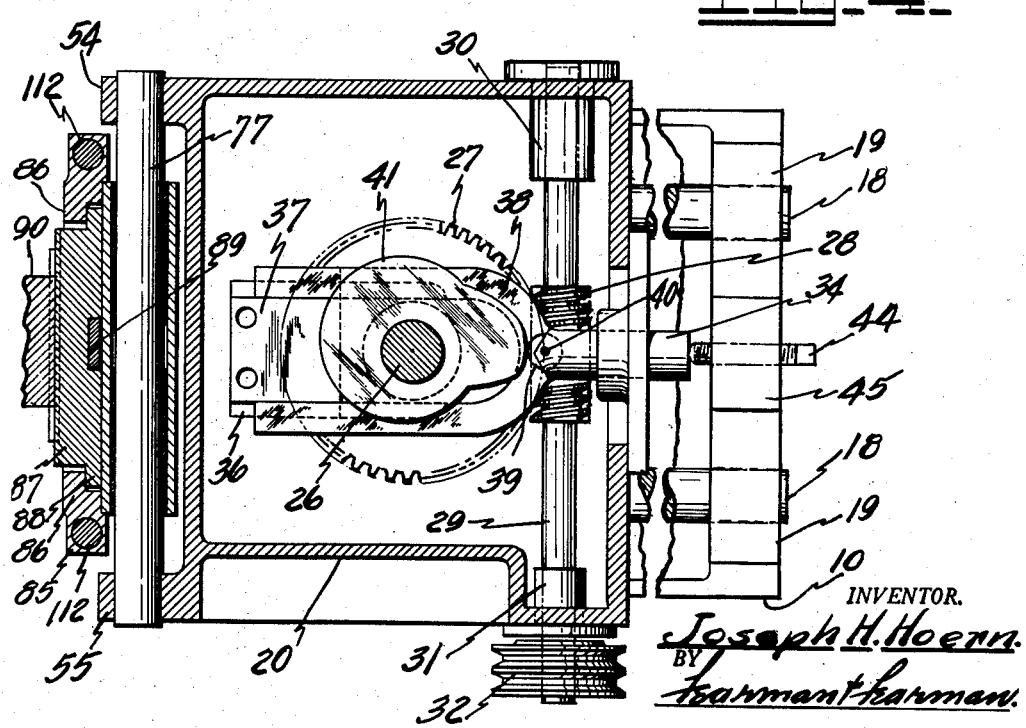
Fig. 4 is a sectional, top plan view taken through the longitudinally movable carriage of the machine on the line IV—IV of Fig. 3, showing the cam means for actuating the carriage, the broken lines indicating certain elements of the machine diagrammatically for the sake of clarity.

Referring now more particularly to the accompanying drawings in which I have shown the preferred embodiments of my invention, a numeral 10 generally indicates the base or frame of my contour milling and boring mechanism which is shown mounted on a suitable frame or bed 11. The base 10 includes side walls 12, a rear wall 13 including a raised central extension 14, and spaced-apart front wall sections 15. The rear wall 13 and front wall sections 15 are recessed as at 16, and thence are formed with grooves as at 17 to receive spaced-apart, stationary slide rods 18, and bearing caps 19 are accommodated in the recesses 16 to secure the rods 18 as usual. A longitudinally movable carriage 20 is mounted on the slide rods 18 and is provided with longitudinally spaced pairs of guide bearings 21 which slidably support the carriage on the rods.

The carriage 20 comprises a generally restangular-shaped housing closed by a top member 22 which is recessed as at 23. Supported in bearings 24 and 25 mounted in the bottom wall of the carriage and top 22 thereof is a vertically disposed cam shaft 26 which is provided with a worm gear 27 driven by means of a worm 28 which is mounted on a transversely disposed shaft 29 and supported by bearings 30 and 31 mounted in the side walls of the carriage. The shaft 29 is provided with a drive pulley 32, and it should be apparent that a conventional motor (not shown) is employed to drive the shaft through a speed reducer (not shown). The shaft of the speed reducer is indicated at S and a belt connecting the shafts S and 29 is indicated at B, a conventional guard member being indicated at G.

Supported by a bushing 33 provided in the rear wall of the carriage 20 is the enlarged shaft 34 of a forwardly extending yoke 35, the legs of the yoke 35 being supported on a guide bracket 36 provided on the bottom wall of the carriage 20 and engaging a guide plate 37 secured on the bracket 36. The inner end of the enlarged shaft 34 of the yoke is bifurcated as at 38 and a roller 39 is pivotally mounted therein as at 40. The roller 39 is in continuous engagement with a cam 41 mounted between spacers 42 and 43 on the cam shaft 26 which controls the movement of the carriage 20 and thereby the longitudinal movement of the cutting tool T as will be hereinafter more fully described. The yoke 35 which does not travel with the carriage, is held against an adjustable stop screw 44 threaded in a block 45 mounted on the section 14 of the base 10 of the mechanism in a manner to be described, and it is the carriage which travels in response to the throw of the cam 41.

It will be observed that the cylinder 46 depends centrally from the rear of the carriage 20 and is best shown in Fig. 3, and end caps 47 and 48 form a closure for said cylinder. Mounted in the bore of the cylinder 46 is a stationary piston P provided on the tubular rod 49 which extends rearwardly through the cap 47, and through an opening 50 provided in the rear wall of the base 10. A plate 51, fixed on the rod 49, prevents movement of the plunger when air, under pressure, is admitted through the tubular rod 49, ports 52 being provided in the inner end of the tubular rod 49 and a pressure fluid supply line 53 communicates with the rod 49 and exerts pressure against the cap 47. Thus, the carriage 20 and cam 41 carried thereby is held in tight engagement with the roller 39 in the yoke 35, which is of course in engagement with the screw 44. Obviously, the pressure medium supplied to the cylinder 46 will be insufficient to interfere with the movement of the carriage 20.

Extension arms 54 and 55 are provided on the front wall of the carriage 20, and aligned pairs of openings are provided therein to receive stationary guide rods 56 and 57 which are secured therein. Mounted on the rods 56 and 57 between the arms 54 and 55 is a cross-slide 58 which includes rearwardly extending slide bearings 59 and 60 in which the rods 56 and 57 are accommodated, spaced-apart friction sleeves 61 being provided within the bearings 59 and 60 as shown. Thus, it will be seen that the cross-slide 58 is movable longitudinally with the carriage 20 and is also capable of transverse movement relative thereto. The movement of the cross-slide is controlled by a cam 61 which is secured to the spacer 43 on the shaft 26. An opening 62 is provided in the side wall of the carriage 20 in horizontal alignment with the edge of the cam, and secured on the wall of the carriage is a plate 63 including a bearing 64 disposed within the opening 62. The bearing 64 supports the shaft 65 of a follower yoke 66 which includes legs engageable with a guide bracket 67.

The bracket 67 includes a flange 68 which is secured to the outer face of the side wall of the carriage opposite the bearing 64, and it will be seen that the bracket 67 projects into the carriage or housing 20 through an opening therein. The legs of the yoke 66 embrace a plate 69 which is mounted on the bracket 67 and functions as a guide to insure that movement of the yoke will be in a transverse direction and unaffected by cutting vibration.

The inner end of the yoke shaft 65 is bifurcated to pivotally receive a roller 70 which is in continuous engagement with the cam 61. The motion of the yoke shaft 65 is transmitted to a rocker arm 71 which is pivotally mounted intermediate its length as at 72, rollers 73 and 74 being rotatably mounted on the ends of said rocker arm which are bifurcated as at 75 and 76.

A horizontally disposed shaft 77 projects laterally from the cross-slide 58 between the slide bearings 59 and 60, thence out through an opening 78 provided in the extension arm 54 of the carriage 20, and into engagement with the roller 74. Obviously, the motion of the rocker arm 71 is transmitted to the shaft 77 to move the cross-slide in response to the throw of the cam 61. The roller 70 is maintained in engagement with the cam 61 by means which includes a transversely disposed cylinder 78 mounted in an opening in the extension arm 55 of the carriage 20, the cylinder 78 including a flange 79 which is secured to the arm 55.

An arm 80 extends rearwardly from the cross-slide 58, said arm projecting into a recessed section 81 of the front wall of the carriage 20, the rod 82 of a plunger 83 being accommodated in the bore of the cylinder 78. A supply line 84 is connected to the one end of the cylinder 78 for supplying a pressure medium thereto, said pressure medium exerting sufficient pressure to retain the yoke in engagement with the cam without interfering with its operation.

Mounted on the front face of the cross-slide 58 are spaced-apart guides 85 formed with flanges 86, the guides defining a T slot for slidably accommodating a vertical slide 87 which is flanged as at 88 to ride in said slot. A vertically disposed locating key 89, fixed to the cross-slide 58, insures absolute vertical movement of the slide 87 on the cross-slide 58, and with this arrangement, it will be obvious that the guide 85 and slide 87 need not be machined to precision tolerances and maintained in close fitting relationship. The employment of the key 89 provides a more rigid structure which cannot bind and will be unaffected by cutting vibration.

Mounted on the vertical slide 87 in a manner to be described is the spindle housing assembly 90 which includes a spindle 91 and a boring attachment 92 on the lower end thereof with the tool T fixed therein. The spindle 91 is driven through a pulley 93 provided on the upper end thereof from a conventional motor (not shown), which may be mounted on the top or side of the carriage 20. It will be observed that the front face of the vertical slide 87 includes transversely extending T-slots 94 and that T-shaped guides 95 on the spindle housing assembly 90 are accommodated therein so that the slide is adjustable transversely on the front face of the vertical slide 87, the locating key 96 provided centrally between the slots 94 insuring an absolute transverse adjustability.

The motion of the vertical slide 87 is controlled by a cam 97 which is mounted on the upper end of the cam shaft 26 within the recessed chamber 23 of the member 22. The cam 97 is in engagement with a roller 98 mounted in the bifurcated end of a longitudinally disposed slide 99 which is accommodated in a passage 100 provided in the member 22.

A cover plate 101 forms a closure for the chamber 23 and has a forwardly inclined bracket 102 cast integral therewith. Pivotally supported on the bracket 102, as at 103, is a bell crank lever 104, which includes a roller 105 mounted on the lower end thereof in engagement with the slide 99. The opposite end of the lever 104 extends forwardly to a point above the vertical slide 87 which is formed with a flanged head 106.

A yoke 107, having rollers 108 rotatably mounted on the inner faces of the legs thereof, embraces the head 106 of the slide 87, and it will be apparent that the rollers 108 ride on the undersurface of the flange portions of the head. Links 109 pivotally secured to the yoke 107 at 110, and to the lever 104 at 111, connect the yoke 107 and front end of the lever 104, and move the yoke in response to the throw of the cam 97.

The slide 87 is retained in engagement with the rollers 108 by vertically disposed pressure cylinders 112 fixed to the guides 85. The rods 113 of the pistons 114 which are accommodated in the bores of the cylinders 112, are fixed to brackets 115 which extend laterally from the vertical slide 87, and it will be clear that when a pressure medium is admitted to the cylinders through the supply lines 116, a downward pressure is exerted against the plungers 114.

A typical workpiece W in which the surfaces to be machined are of non-symmetrical irregular configuration is illustrated in Figs. 7 and 8. In this instance, it is desired to machine the slotted surfaces 117, 118, 119 and 120, and it will be observed that the surfaces 117 and 118 are of greater depth than the surfaces 119 and 120 and that the surface 117 is of greater length than the surface 118 and the surface 119 and 120 and is closer to the peripheral edge of the workpiece than are the other surfaces. Obviously, to machine a workpiece of this nature in one operation will require a milling or boring mechanism whose simultaneous longitudinal, vertical, and transverse movement is absolutely synchronized.

The workpiece, of course, is clamped in position on a worktable (not shown) which is stationary during the machining operation, but which is preferably indexible so that the machining operation on a given workpiece can begin as soon as the work on the preceding workpiece has been completed.

As previously noted, the pressure in the cylinder 46 is exerted upon the rear cap 48. Thus, the yoke 35 is maintained in stationary position between the stop screws 44 and cam 41, and the carriage 20 moves on the guide rods 18 of the base 10 in response to the eccentricity of the cam. The cam 61 controls the movement of the cross slide 58 which is mounted on the slide rods 56 and 57 of the carriage through a yoke 66, lever 71, and shaft 77 on the cross slide. The yoke 66 in this instance moves relative to the cam 61, but is maintained in operative engagement therewith by the pressure medium in the cylinder 78, the plunger 83 therein moving relative to the cylinder which is mounted on the carriage 20.

The vertical movement of the slide 87 which is mounted in guides 85 on the front face of the cross-slide 58 is controlled by the cam 97 through a slide 99, bell crank lever 104, links 109, and a yoke 107. The pressure medium in the cylinders 112 tends to force the slide 87 downwardly, thus maintaining the head 106 thereof in operative engagement with the yoke 107.

To alter the path taken by the tool T to machine work surfaces of different configuration, it will merely be necessary to change the cams 41, 61, and 97, and possibly the setting of the stop screw 44. Also, the spindle housing assembly 90 is transversely adjustable on the vertical slide 87 and the spindle 91 has a limited vertical adjustment in its housing 90.

It will thus be apparent that I have perfected a milling or boring machine for machining workpieces of irregular configuration which is well adapted to the machining of large quantities of workpieces on a production basis to rigid tolerance requirements. It is to be understood that various equivalent changes may be made in the various elements of the machine without departing from the spirit of the invention or the scope of the appended claims.

What I claim is:

1. In a contouring machine tool; a frame; a carriage movable longitudinally thereon; cross-slide means movable transversely on said carriage; a holder carried by said cross-slide means; a cam shaft rotatably journaled in and carried by said carriage; means for driving said cam shaft; cam means on said cam shaft and carriage; a member on said frame cooperable with said cam means and fixed with relation to said cam shaft so that said cam means causes longitudinal movement of said carriage responsive to the configuration of said cam means and relative to said frame; said carriage being biased to hold said cam means in operative engagement with said member; a second cam means on said cam shaft; a slide tappet carried by said carriage for reciprocating movement in a linear path having engagement with said second cam means; and a lever carried by said carriage having one end in engagement with said tappet and another end in operative engagement with said cross-slide means for translating movement of said slide tappet into movement of said cross-slide means transversely of said carriage and its path of movement; said cross-slide means being biased so as to be held in operating engagement with said lever.

2. The combination defined in claim 1 in which said slide tappet has portions straddling opposite sides of said cam shaft and extending from the side of said cam shaft adjacent said lever beyond the side remote from said lever; and guides carried by said carriage for said straddling portions extending in planes parallel to the axis of said tappet.

3. In a contouring machine tool; a frame a carriage movable longitudinally thereon; cross-slide means movable transversely on said carriage; slide means movable on said cross-slide means in a direction substantially perpendicular to the paths of movement of said carriage and cross-slide means; a holder on said slide means; a cam shaft rotatably journaled in and carried by said carriage; means for driving said cam shaft, cam means on said cam shaft and carriage; a follower part on said frame cooperable with said cam means and fixed on said frame so that said cam means causes longitudinal movement of said carriage responsive to the configuration of said cam means and relative to said frame; said carriage being biased to hold said cam means in operative engagement with said part and accordingly return as permitted by said cam means; a second cam means on said cam shaft; a slide tappet carried by said carriage in the plane of said second cam means for reciprocating movement in a linear path in line with the axis of said cam shaft; a lever carried on said carriage; said lever having one end in engagement with said tappet and another end in operative engagement with said cross-slide means for causing movement thereof transversely responsive to said second cam means; said cross-slide means being biased so as to be held in operative engagement with said lever; a third cam means on said cam shaft; a second slide tappet carried by said carriage in the plane of said third cam means for reciprocating movement in a linear path; and a second lever carried by said carriage with one end engaging said second tappet and the other operatively engaging said slide means; said slide means being biased so as to be held in operative engagement with said second lever.

4. The combination defined in claim 1 in which slide means including said holder is supported on said carriage which is movable in a direction substantially perpendicular to the paths of movement of said carriage and cross-slide; a third cam means is carried on said cam shaft; and motion transmission means carried entirely by said carriage is provided having one part in engagement with said third cam means and another part in engagement with said slide means to transfer movement thereto.

5. The combination defined in claim 1 in which said holder carried by the cross-slide means is a tool holder which mounts a tool therein.

6. The combination defined in claim 1 in which said member on said frame cooperable with said cam means comprises a curvilinear surface engaging said cam means with which it is cooperable.

References Cited in the file of this patent

UNITED STATES PATENTS

| 2,317,411 | Seyferth | Apr. 27, 1943 |
| 2,462,126 | Peat | Feb. 22, 1949 |
| 2,674,160 | Martellotti | Apr. 6, 1954 |
| 2,710,563 | Messmer | June 14, 1955 |

FOREIGN PATENTS

| 579,541 | France | Oct. 18, 1924 |
| 668,339 | Great Britain | Mar. 12, 1952 |
| 1,021,378 | France | Feb. 18, 1953 |